United States Patent
Hayashi et al.

(10) Patent No.: US 7,965,383 B2
(45) Date of Patent: Jun. 21, 2011

(54) SURVEYING DEVICE AND SURVEYING SYSTEM

(75) Inventors: Kunihiro Hayashi, Itabashi-ku (JP);
Fumio Ohtomo, Itabashi-ku (JP);
Kaoru Kumagai, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 146 days.

(21) Appl. No.: 12/383,129

(22) Filed: Mar. 20, 2009

(65) Prior Publication Data
US 2009/0241359 A1    Oct. 1, 2009

(30) Foreign Application Priority Data

Mar. 26, 2008 (JP) ................................ 2008-081312

(51) Int. Cl.
*G01C 3/08* (2006.01)
(52) U.S. Cl. ...................................... 356/4.01; 356/5.01
(58) Field of Classification Search ................ 356/4.01, 356/5.01, 141.1; 702/159
See application file for complete search history.

(56) References Cited

U.S. PATENT DOCUMENTS

| | | | |
|---|---|---|---|
| 5,988,862 A * | 11/1999 | Kacyra et al. | 703/6 |
| 6,246,468 B1 * | 6/2001 | Dimsdale | 356/4.02 |
| 7,110,102 B2 | 9/2006 | Ohtomo et al. | 356/141.4 |
| 7,306,339 B2 * | 12/2007 | Kaufman et al. | 353/28 |
| 7,400,386 B2 * | 7/2008 | Jamieson et al. | 356/28.5 |
| 7,474,388 B2 | 1/2009 | Ohtomo et al. | 356/4.07 |
| 2007/0263202 A1 * | 11/2007 | Ohtomo et al. | 356/4.01 |
| 2008/0074638 A1 | 3/2008 | Sakimura et al. | 356/4.01 |

FOREIGN PATENT DOCUMENTS

| | | |
|---|---|---|
| EP | 1 503 176 | 2/2005 |
| JP | 2004-212058 | 7/2004 |
| JP | 2005-43088 | 2/2005 |
| JP | 2006-337302 | 12/2006 |
| JP | 2008-82895 | 4/2008 |

* cited by examiner

*Primary Examiner* — Isam Alsomiri
(74) *Attorney, Agent, or Firm* — Nields, Lemack & Frame, LLC

(57) ABSTRACT

The present invention provides a surveying device, which comprises a light source for emitting a distance measuring light 6, an elevation rotary mirror 56 for deflecting said distance measuring light in a direction toward an object to be measured, a high-speed deflection mirror 62 for deflecting said distance measuring light at a speed higher than said elevation rotary mirror, a distance measuring light projecting unit for projecting said distance measuring light, and an arithmetic control unit for controlling driving of said high-speed deflection mirror and said elevation rotary mirror.

16 Claims, 11 Drawing Sheets

SURVEYING DEVICE AND SURVEYING SYSTEM

BACKGROUND OF THE INVENTION

The present invention relates to a surveying device and a surveying system when a surveying operation is performed by a single surveying operator or by cooperation of two or more surveying operators.

In a surveying operation performed in a civil engineering work, e.g. a surveying operation in a road construction, a measurement is performed on positions on both sides of the road, on a difference in elevation, on a width of the road, etc., and a plurality of measuring points are measured at the same time. As a result, the surveying operation is a cooperative operation to be performed by two or more surveying operators.

A surveying device, by which measurement can be made on a plurality of measuring points at the same time, is disclosed in JP-A-2006-337302.

In a surveying device according to JP-A-2006-337302, laser beams for forming reference plane including three or more fan-shaped laser beams, with at least one of the laser beams being tilted, are projected in rotary irradiation, and the reference plane is formed. Further, an elevation angle is measured according to a time difference when a photodetection unit of a side of an object to be measured receives a plurality of fan-shaped laser beams. Also, by receiving a reflected laser beam from the object to be measured, a horizontal angle is measured from a projecting direction of the fan-shaped laser beam at the moment when the reflected laser beam is received. Further, the surveying device projects a distance measuring light, which are spread in vertical direction, in rotary irradiation. Then, the reflected distance measuring light from the object to be measured is received, and an electro-optical distance measurement is performed on a distance to the object to be measured. A position in vertical direction of the object to be measured is calculated based on an elevation angle and the measured distance, and a three-dimensional position of the object to be measured is measured.

By the surveying device as described above, measurement can be performed at the same time on a plurality of objects to be measured (hereinafter referred as "multi-measurement), which are present within a projecting range of the fan-shaped laser beam and of the distance measuring light, by projecting the fan-shaped laser beams and the distance measuring light spread in vertical direction in rotary irradiation, i.e. on a plurality of objects to be measured which are present within total circumference in horizontal direction and within the range of spreading in vertical direction of these two types of laser beams.

By the surveying device as described above, the distance measuring lights spread in vertical direction are projected in rotary irradiation. Then, the reflected light from the objects to be measured are received, and the electro-optical distance measurement is performed. As a result, an optical intensity of each of the distance measuring light is decreased, and influence of noise light becomes stronger, and this leads to lower measurement accuracy. Further, because the distance measuring light is rotated at high velocity, a measuring time of one measurement is short. Also, there are not many distance measurement data to be averaged, and it is not possible to improve the measurement accuracy. For the purpose of improving the measurement accuracy, the light must be projected in rotary irradiation many times, longer time is required for the measurement, and a working efficiency is decreased.

Further, because the distance measuring light is spread in vertical direction, an optical intensity of the received light is decreased more when the distance to be measured is longer. Thus, these are a problem that the distance which can be measured is lengthen, and other problems.

A total station is known as a means, by which measurement can be made to a measuring point with higher accuracy. The total station has a tracking function. For instance, similarly to the case of design-based surveying operation, a surveying operator moves an object to be measured (prism) to each of the measuring points. The total station tracks each object to be measured and performs the measurement on each of the measuring points.

The total station with tracking function can be operated by one operator (one-man operated measurement). The measurement can be made with high accuracy and a working efficiency of the measurement is also high, but it is not possible to perform measurements at a multiple points at the same time. As a result, in case it is necessary to perform measurements on a multiple points at the same time, the working efficiency is extremely decreased.

JP-A-2004-212058 discloses a method, by which two or more fan-shaped laser beams, with at least one fan-shaped laser beam being tilted, are projected in rotary irradiation, a horizontal reference plane is formed, and an elevation angle with respect to the horizontal reference plane is determined from a tilt angle of the tilted-fan-shaped laser beam.

SUMMARY OF THE INVENTION

It is an object of the present invention to provide a surveying device and a surveying system, by which it is possible to perform a multi-measurement on a multiple points at the same time, and also to perform the one-man operated measurement, and to accomplish the measurement with high accuracy.

To attain the above object, the present invention provides a surveying device, comprising a light source for emitting a distance measuring light, an elevation rotary mirror for deflecting the distance measuring light in a direction toward an object to be measured, a high-speed deflection mirror for deflecting the distance measuring light at a speed higher than the elevation rotary mirror, a distance measuring light projecting unit for projecting the distance measuring light, and an arithmetic control unit for controlling driving of the high-speed deflection mirror and the elevation rotary mirror.

Also, the present invention provides the surveying device as described above, wherein the high-speed deflection mirror gives an amplitude in elevation direction to the distance measuring light. Further, the present invention provides the surveying device as described above, wherein the high-speed deflection mirror is disposed on an optical axis passing portion of the elevation rotary mirror, the distance measuring light is projected via the high-speed deflection mirror, and the reflected distance measuring light reflected by the object to be measured is received via a condensing member. Also, the present invention provides the surveying device as described above, wherein the high-speed deflection mirror is disposed on one surface of the elevation rotary mirror, and the other surface of the elevation rotary mirror is used as a reflection mirror. Further, the present invention provides the surveying device as described above, wherein a mirror surface of the elevation rotary mirror is arranged by using a mirror surface of the high-speed deflection mirror, and the elevation rotary mirror deflects the distance measuring light in a direction of the object to be measured by a driving unit for driving a holding unit for holding the high-speed deflection mirror.

Also, the present invention provides the surveying device as described above, wherein the distance measuring light projecting unit, comprises a rotator for projecting the distance measuring light in rotary irradiation, an image rotator, and an image rotator rotating unit for rotating said image rotator, and wherein the rotator can be adjusted by the image rotator rotating unit so that a deflecting direction of the distance measuring light reflected by the high-speed deflection mirror is directed in a direction toward the object to be measured. Further, the present invention provides the surveying device as described above, wherein the distance measuring light projecting unit has an elevation rotary mirror for deflecting the distance measuring light in a direction toward the object to be measured, wherein two of the high-speed deflection mirrors are disposed at positions opposite to each other, and wherein the high-speed deflection mirrors have reflection surfaces with different moving directions, and the deflecting direction of the distance measuring light projected via the two high-speed deflection mirror can be adjusted so that it is directed toward the object to be measured. Also, the present invention provides the surveying device as described above, wherein the distance measuring light is projected with a deflection range in elevation direction extended by a deflection range extending member, and wherein the reflected distance measuring light reflected by the object to be measured is received via a condensing member. Further, the present invention provides the surveying device as described above, further comprising a fan-shaped beam projecting unit for projecting two or more fan-shaped beams with at least one of the fan-shaped beams being tilted, a fan-shaped beam receiving unit for receiving the reflected fan-shaped beam reflected from the object to be measured, and a fan-shaped beam projecting direction detecting unit for detecting a fan-shaped beam projecting direction of the fan-shaped beam projecting unit, wherein the arithmetic control unit calculates a direction of the object to be measured based on signal from the fan-shaped beam receiving unit and from the fan-shaped beam projecting direction detecting unit. Also, the present invention provides the surveying device as described above, wherein the arithmetic control unit controls the high-speed deflection mirror and the rotating unit so that the projected distance measuring light is projected to the object to be measured based on the acquired direction of the object to be measured. Further, the present invention provides the surveying device as described above, wherein the high-speed deflection mirror is a MEMS mirror.

Also, the present invention provides a surveying system, comprising a surveying device and an object to be measured, wherein the surveying device comprises a distance measuring light projecting unit, which has a light source for emitting a distance measuring light, an elevation rotary mirror for deflecting the distance measuring light in a direction toward an object to be measured, and a high-speed deflection mirror for deflecting the distance measuring light at a speed higher than the elevation rotary mirror, for projecting the distance measuring light, a projecting direction detecting unit for detecting a projecting direction of the distance measuring light from the distance measuring light projecting unit, a distance measuring unit for measuring a distance based on a reflection light from the object to be measured, a fan-shaped beam projecting unit for projecting two or more fan-shaped beams, with at least of one of the fan-shaped beams being tilted, in rotary irradiation, a first communication unit, and an arithmetic control unit for controlling a driving of the elevation rotary mirror and the high speed deflecting mirror, and wherein the object to be measured has a reflector for reflecting the distance measuring light, a fan-shaped beam receiving unit for receiving the fan-shaped beams, and a second communication unit for transmitting a signal from the fan-shaped beam receiving unit to the first communication unit.

The present invention provides the surveying system as described above, wherein the high-speed deflection mirror is disposed on an optical axis passing portion of the elevation rotary mirror, the distance measuring light is projected via the high-speed deflection mirror, and the reflected distance measuring light reflected by the object to be measured is received via a condensing member. Also, the present invention provides the surveying system as described above, wherein the high-speed deflection mirror is disposed on one surface of the elevation rotary mirror, and the other surface of the elevation rotary mirror is used as a reflection mirror. Further, the present invention provides the surveying system as described above, wherein the distance measuring light projecting unit comprises a rotator for projecting the distance measuring light in rotary irradiation, an image rotator, and an image rotator rotating unit for rotating said image rotator, and wherein the rotator can be adjusted by the image rotator rotating unit so that deflecting direction of the distance measuring light reflected by the high-speed deflection mirror is directed in a direction toward the object to be measured. Also, the present invention provides the surveying system as described above, wherein the distance measuring light projecting unit has an elevation rotary mirror for deflecting the distance measuring light in a direction toward the object to be measured, wherein two of the high-speed deflection mirrors are disposed at positions opposite to each other, and wherein the high-speed deflection mirrors have reflection surfaces with different moving directions, and the deflecting direction of the distance measuring light projected via the two high-speed deflection mirror can be adjusted so that it is directed toward the object to be measured. Further, the present invention provides the surveying system as described above, wherein the distance measuring light is projected with a deflection range in elevation direction extended by a deflection range extending member, and wherein the reflected distance measuring light reflected by the object to be measured is received via a condensing member.

The present invention provides a surveying device, comprising a light source for emitting a distance measuring light, an elevation rotary mirror for deflecting the distance measuring light in a direction toward an object to be measured, a high-speed deflection mirror for deflecting the distance measuring light at a speed higher than the elevation rotary mirror, a distance measuring light projecting unit for projecting the distance measuring light, and an arithmetic control unit for controlling driving of the high-speed deflection mirror and the elevation rotary mirror. As a result, in case where there are a plurality of objects to be measured in wide range, the measurement can be performed on a plurality of objects to be measured at the same time by projecting the fan-shaped beam in rotary irradiation. And in case where there is an object to be measured, the measurement can be performed with high accuracy by projecting the spot-type light. Accordingly, the measurement in wide range and the measurement with high accuracy can be performed on a plurality of objects to be measured by a single surveying device. Further, optical density is not decreased and the measurement can be performed for the long distance because the fan-shaped distance measuring light can be formed by amplifying spot-type lights.

Also, the present invention provides the surveying device as described above, further comprising a fan-shaped beam projecting unit for projecting two or more fan-shaped beams with at least one of the fan-shaped beams being tilted, a fan-shaped beam receiving unit for receiving the reflected fan-shaped beam reflected from the object to be measured, and a fan-shaped beam projecting direction detecting unit for detecting a fan-shaped beam projecting direction of the fan-shaped beam projecting unit, wherein the arithmetic control unit calculates a direction of the object to be measured based on signal from the fan-shaped beam receiving unit and from the fan-shaped beam projecting direction detecting unit. As a result, it is possible to obtain the reflection light from the object to be measured quickly and accurately, an efficiency of the surveying operation is improved.

Further, the present invention provides a surveying system, which comprises a surveying device and an object to be measured, wherein the surveying device comprises a distance measuring light projecting unit, which has a light source for emitting a distance measuring light, an elevation rotary mirror for deflecting the distance measuring light in a direction toward an object to be measured, and a high-speed deflection mirror for deflecting the distance measuring light at a speed higher than the elevation rotary mirror, for projecting the distance measuring light, a projecting direction detecting unit for detecting a projecting direction of the distance measuring light from the distance measuring light projecting unit, a distance measuring unit for measuring a distance based on a reflection light from the object to be measured, a fan-shaped beam projecting unit for projecting two or more fan-shaped beams, with at least of one of the fan-shaped beams being tilted, in rotary irradiation, a first communication unit, and an arithmetic control unit for controlling a driving of the elevation rotary mirror and the high speed deflecting mirror, and wherein the object to be measured has a reflector for reflecting the distance measuring light, a fan-shaped beam receiving unit for receiving the fan-shaped beams, and a second communication unit for transmitting a signal from the fan-shaped beam receiving unit to the first communication unit. As a result, data and an information of measurement can be given and taken between the surveying device and the object to be measured, and it is possible to perform the measurement in wide range with high working efficiency.

BRIEF DESCRIPTION OF THE DRAWINGS

FIG. 6 is a schematical drawing to show an arrangement of a reference plane forming unit of the surveying device;

DETAILED DESCRIPTION OF THE PREFERRED EMBODIMENTS

A description will be given below on the best mode for carrying out the present invention by referring to the attached drawings.

First, referring to FIG. 1 and FIG. 2, a description will be given on general features of a surveying system in an embodiment of the present invention.

The surveying system comprises a surveying device 1 and at least one photodetection device 7. The surveying device 1 and the photodetection device 7 can give and take data to and from each other via a communication means.

Figure 1:
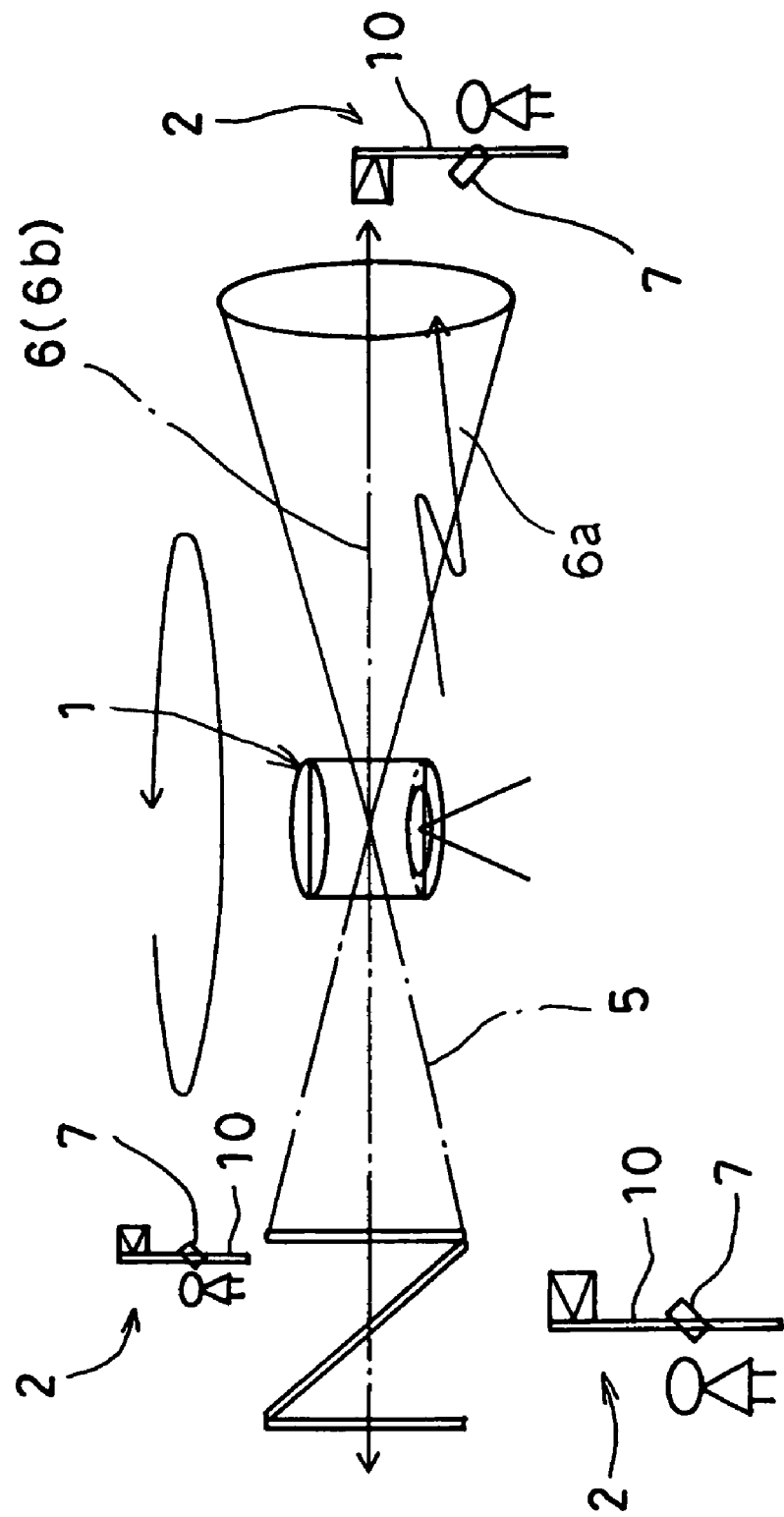
FIG. 1 is a schematical drawing of a first embodiment of the present invention in a case where multi-measurement is performed.

FIG. 1 shows a case where the multi-measurement is performed by using the surveying device 1 and a plurality of objects 2 to be measured.

The surveying device 1 is installed at a known point via a tripod 8 and can project laser beams 5 for forming a reference plane at a constant velocity in rotary irradiation and can project distance measuring light 6 in rotary irradiation. Each of the objects 2 to be measured has the photodetection device 7, including a reflection prism, and a pole 10, and the photodetection device 7 is installed at a known height on the pole 10. The photodetection device 7 receives the laser beams projected from the surveying device 1 and reflects the laser beams to the surveying device 1.

The surveying device 1 can measure a distance to each of the photodetection devices 7 installed at a plurality of points by receiving the distance measuring light 6 reflected from the photodetection devices 7.

A reference plane forming unit 3 forms a horizontal reference plane by projecting the laser beams 5 for forming the reference plane at a constant velocity in rotary irradiation. The laser beams 5 for forming the reference plane is made up of two or more fan-shaped laser beams, of which at least one beam is tilted at a known angle. (In the figure, the laser beams 5 is made up of three fan-shaped laser beams with cross-section of luminous fluxes in N-shaped form (hereinafter, may be referred as "N-shaped fan-shaped beams")).

The surveying device 1 projects the laser beam 5 for forming reference plane in rotary irradiation. By obtaining the difference of time when the photodetection device 7 detects two or more fan-shaped laser beams, it is possible to determine an elevation angle with respect to the horizontal reference plane with the surveying device 1 at a center from the time difference and a tilt angle of the tilted fan-shaped laser beam. Based on the elevation angle, a tilting reference plane can be set.

A distance measuring light projecting unit 4 projects the distance measuring light 6 in rotary irradiation. The distance measuring light 6 is a spot-type distance measuring light 6b which is luminous flux running approximately in parallel with a small diameter and can perform the scanning reciprocally at high velocity by a high-speed deflection mirror 62 to be described later. Because the distance measuring light 6 is vibrated at high velocity, it is also possible to give a predetermined amplitude and to form the fan-shaped distance measuring light 6a substantially spread in vertical direction.

The distance measuring light projecting unit 4 is so designed that it is possible to project by selecting either the spot-type distance measuring light 6b or the fan-shaped distance measuring light 6a as the distance measuring light. There are two cases in the fan-shaped distance measuring light 6a: a case where the fan-shaped distance measuring light 6a have a cross-section of the luminous fluxes spreading in elevation direction optically, and a case where the spot-type light with the small diameter are reciprocally scanned in elevation direction at an angle as required.

When the fan-shaped distance measuring light 6a are projected, the distance measuring light reflected from the objects 2 to be measured within the range of spreading are received, and the distances to the objects 2 to be measured are determined. By projecting the fan-shaped distance measuring light 6a in rotary irradiation, it is possible to measure a distance to each of the plurality of objects 2 to be measured at the same time. Also, from the elevation angle measured by the laser beams 5 for forming reference plane and from a distance measured by the fan-shaped distance measuring light 6a, it is possible to measure a position of each of the objects 2 to be measured in direction of height.

Figure 2:
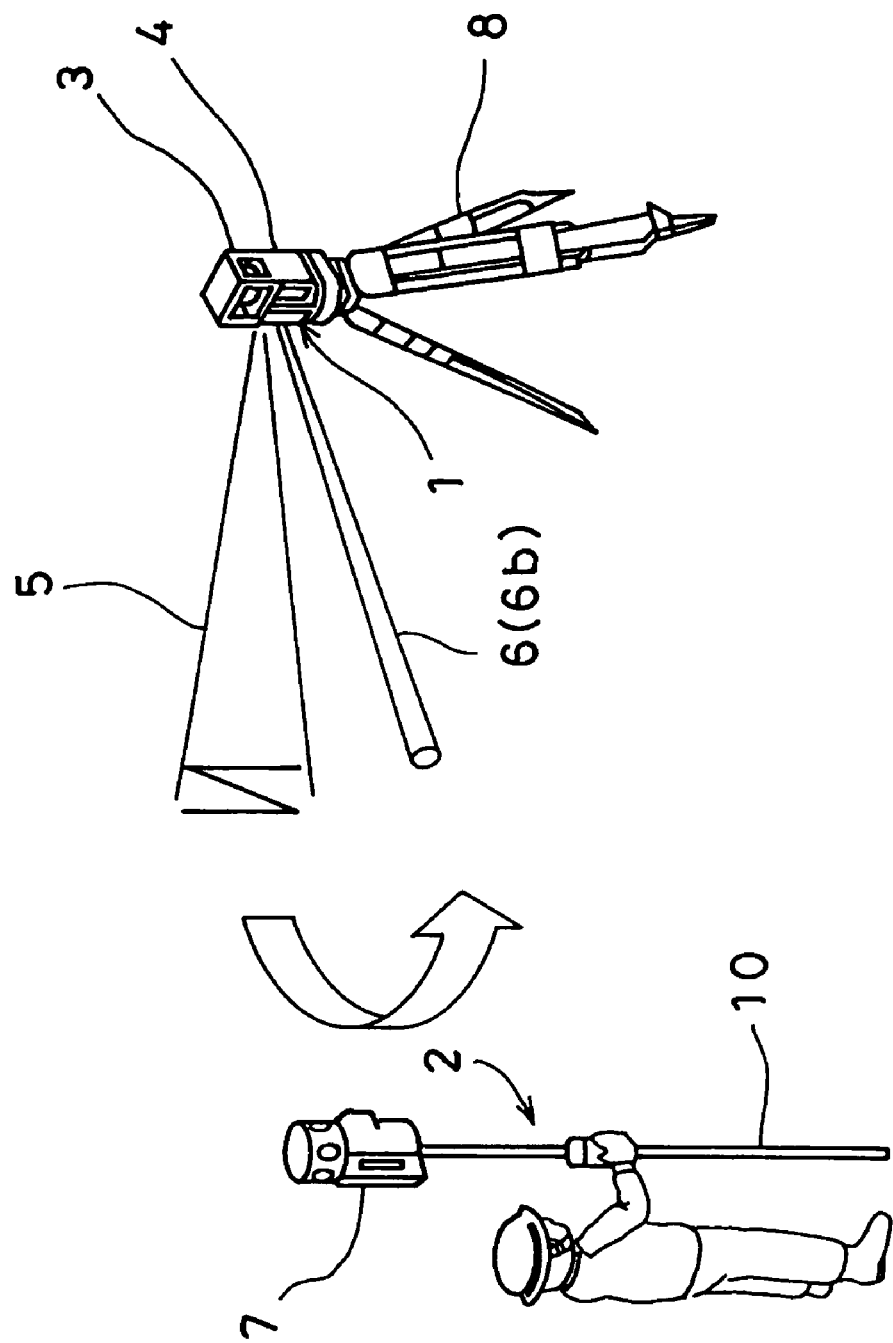
FIG. 2 is a schematical drawing of the first embodiment of the present invention to show a case where one-man operated measurement is performed.

FIG. 2 shows a case where one-man operated measurement is performed. When carrying out the one-man operated measurement, the spot-type distance measuring light 6b is projected from the distance measuring light projecting unit 4.

First, the laser beams 5 for forming reference plane are projected in rotary irradiation from the surveying device 1. The photodetection device 7 measures an elevation angle based on the difference of the photodetection time from each of two or more fan-shaped laser beams, and the result of the measurement is transmitted to the surveying device 1. The surveying device 1 receives elevation angle data and receives a reflection light reflected from the object 2 to be measured. Based on a value on an angle detector at the moment when the reflection light is received, a horizontal angle is detected. As for the elevation angle, the surveying device 1 may calculate the elevation angle based on the difference of photodetection time of the reflection light from the object 2 to be measured.

From the horizontal angle and the elevation angle, a direction of the photodetection device 7 as seen from the surveying device 1 is determined, and the spot-type distance measuring light 6b is projected in the direction as determined. In this case, the distance measuring light is laser beam, which has small beam diameter and the beams are running approximately in parallel. When the spot-type distance measuring light 6b is projected to the photodetection device 7, and the distance measuring light reflected from the photodetection device 7 is received by the surveying device 1, the projection of the laser beams 5 for forming reference plane in rotary irradiation is stopped, and the measurement by tracking is started.

In case where the objects 2 to be measured could not be detected by the laser beams 5 for forming reference plane, the fan-shaped distance measuring light 6a or the tracking light 25 are continuously emitted, and the objects 2 to be measured may be searched by projecting the lights in rotary irradiation and by shifting the lights in vertical direction.

In the one-man operated measurement, the diameter of the distance measuring light 6 is small and the optical intensity is high. Accordingly, the influence from the noise light is low, and the distance measurement can be made on long distance. Because the measurement is performed while tracking the photodetection device 7, there is enough time for measurement, and the measurement accuracy is high.

As described above, according to the present invention, in case of the multi-measurement and in the case of the one-man operated measurement, the distance measuring light 6 with different shapes of beams can be selected and are projected. In case of the multi-measurement, the fan-shaped distance measuring light 6a is projected with spreading angle in vertical direction. In case of the one-man operated measurement, the spot-type distance measuring light 6b with small diameter and narrow spreading is projected.

Now, referring to FIG. 3 to FIG. 7, a description will be given below on the first embodiment of the present invention.

The surveying device 1 primarily comprises a leveling unit 11, a main unit 12 mounted on a tripod 8 (see FIG. 2) via the leveling unit 11, and a rotator 13, which is rotatably mounted on the main unit 12.

The leveling unit 11 is used to perform the leveling of the surveying device 1 and the leveling unit 11 has a point laser beam projecting unit 14, which projects laser beams downward in vertical direction. The position where the surveying device 1 is installed can be determined by a point on a ground surface where the point laser beam is projected.

A distance measuring unit 15, a distance measuring optical unit 16, an elevation rotation axis tilt detecting unit 17, a tilt sensor 10, a main unit controller 19, a communication unit 21, a power source 22, etc. are accommodated in the main unit 12.

The distance measuring unit 15 has a distance measuring light source (not shown), and a tracking light source (not shown). The distance measuring light 6 is projected from the distance measuring optical unit 16 via a first glass fiber 24, and a tracking light 25 is projected from the distance measuring optical unit 16 via a second glass fiber 26. A reflected distance measuring light 6' reflected from the object 2 to be measured is received via the distance measuring optical unit 16, and is guided toward the distance measuring unit 15 via a third glass fiber 27.

The distance measuring unit 15 performs the distance measurement by comparing the reflected distance measuring light 6' with an internal reference light (not shown), which is obtained by dividing the distance measuring light 6.

Tilting of the main unit 12 is detected by the tilt sensor 18. On a lower end of the rotator 13, a rotary ring 28, which is a reflection mirror, is provided, and the elevation rotation axis tilt detecting unit 17 is disposed at a position opposite to the rotary ring 28.

The elevation rotation axis tilt detecting unit 17 projects a detection light toward the rotary ring 28 and the detection light reflected by the rotary ring 28 is received by a photodetection sensor 29. A tilting of the rotary ring 28, i.e. a tilting of rotation axis of the rotator 13, is detected according to a deviation of a photodetecting position of the detection light on the photodetection sensor 29.

The rotary ring 28 also fulfills the function as a pattern ring of a horizontal angle detecting encoder 31. Based on a signal from a pattern detecting unit 32, a horizontal angle is detected. The horizontal angle detecting encoder 31 has a reference point, and serves as an absolute encoder, which can detect an angle from the reference point.

Now, referring to FIG. 5, a description will be given on the distance measuring optical unit 16.

Figure 5:
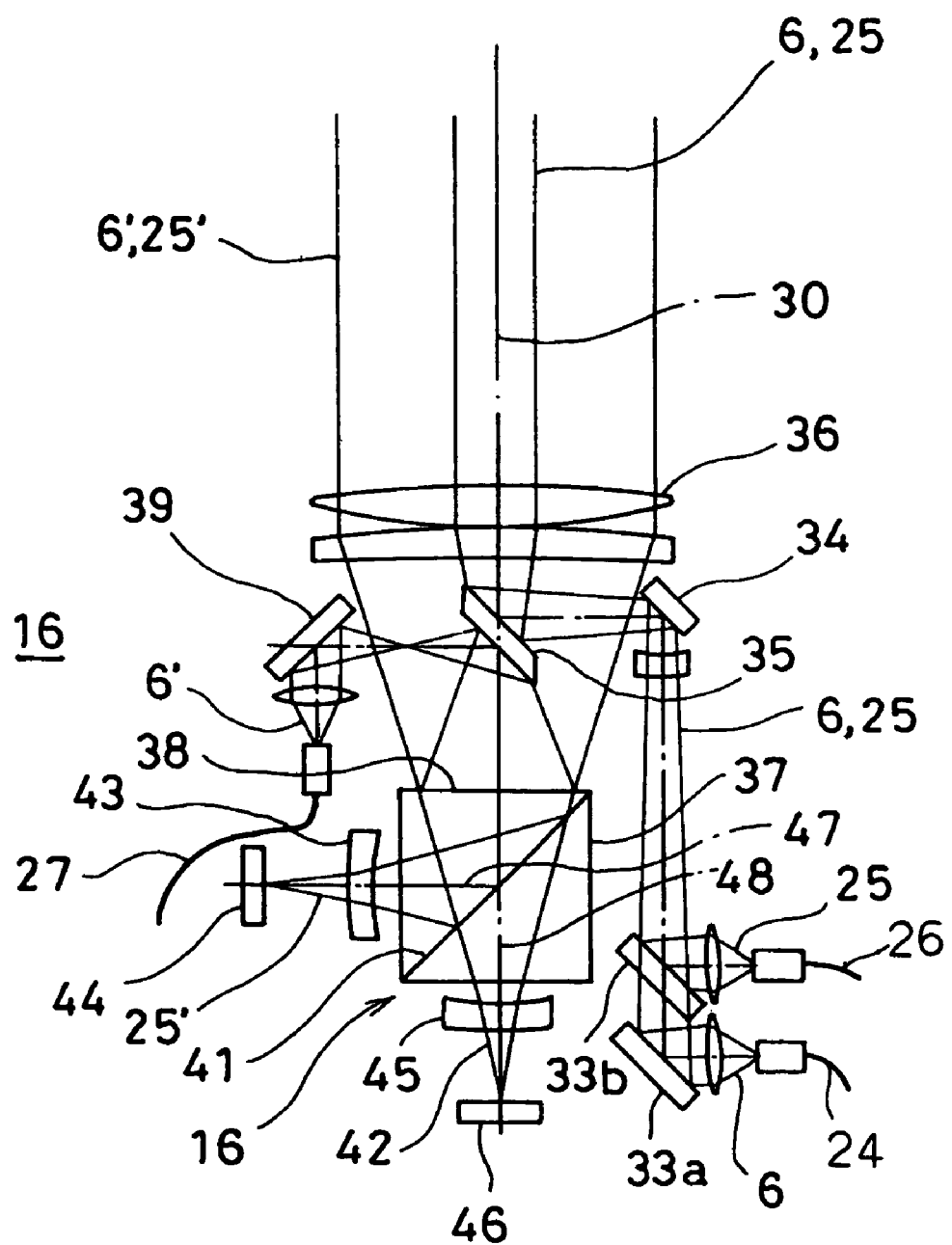
FIG. 5 is a schematical block diagram to show a distance measuring optical system of the surveying device.

In FIG. 5, reference numeral 30 denotes a distance measuring optical axis, and the distance measuring optical axis 30 concurs with the rotation axis of the rotator 13. A condenser lens 36, a mirror 35, and a beam splitter 37 are disposed on the distance measuring light optical axis 30. A condenser lens 43 and a tracking light photodetection sensor 44 are disposed on a reflection light optical axis 47 from the beam splitter 37. A condenser lens 45 and an image photodetection sensor 46 are disposed on a transmission light optical axis 48 of the beam splitter 37.

The distance measuring light 6 is reflected by a mirror 33a, and the tracking light 25 is reflected by a mirror 33b along the same optical path as the optical path of the distance measuring light 6. The distance measuring light 6 has a wavelength different from the wavelength of the tracking light 25, and the mirror 33b is designed to form a reflection film so that the reflection film allows the distance measuring light 6 to pass and reflects the tracking light 25.

The distance measuring light 6 and the tracking light 25 are deflected by the mirror 34 and the mirror 35 and are projected along the distance measuring optical axis 30. The distance measuring light 6 and the tracking light 25 are turned to parallel luminous flux beams, which are then deflected in horizontal direction via the rotator 13 and are projected.

A reflected distance measuring light 6' as reflected by the object 2 to be measured enters the distance measuring optical unit 16 via the rotator 13. Then, the reflected distance measuring light 6' is converged by the condenser lens 36 and is reflected by an upper reflection surface 38 of the beam splitter 37. Further, the reflected distance measuring light 6' is reflected by the mirror 35 and the mirror 39 and enters the third glass fiber 27.

Of a reflected tracking light 25' and a visible light (natural light) 42, which passed through the upper reflection surface 38, the reflected tracking light 25' is reflected by an inner reflection surface 41. Then, the reflected tracking light 25' is converged by a condenser lens 43 and is received by a tracking light photodetection sensor 44. The visible light 42 passes through the inner reflection surface 41, is converged by the condenser lens 45, and is received by the image photodetection sensor 46.

On the upper reflection surface 38, a reflection film is formed, which reflects the reflected distance measuring light 6' and allows the reflected tracking light 25' and the visible light 42 to pass through. On the inner reflection surface 41, a reflection surface is formed, which reflects the reflected tracking light 25' and allows the visible light 42 to pass through.

As the tracking light photodetection sensor 44 and the image photodetection sensor 46, an aggregate of a multiple pixels such as CCD, CMOS sensor, etc. is adopted. An address (a position on a photodetection element) of each pixel can be identified, and a field angle (angle of view) of each pixel can be found.

The distance measuring light 6 and the tracking light 25 are projected toward the distance measuring optical axis 30 by the distance measuring optical unit 16, and the reflected distance measuring light 6', the reflected tracking light 25', and the visible light 42 entering the distance measuring optical unit 16 can be separately received and detected.

The first glass fiber 24, the mirror 33a, the mirror 35, an elevation rotary mirror 56 (to be described later), the rotator 13, etc. make up together a distance measuring light projecting optical unit. The rotator 13, the elevation rotary mirror 56, the beam splitter 37, the mirror 35, the mirror 39, the third glass fiber 27, etc. make up together a photodetection optical unit.

The arithmetic control unit 19 controls the distance measuring unit 15 and also controls driving units such as a horizontal rotary motor 52 and an elevation rotary motor 57 (to be described later). When the fan-shaped distance measuring light 6a is selected for the distance measurement, the distance measuring unit 15 is so controlled that the laser beams 5 for forming reference plane can be projected at the same time as the projection of the fan-shaped distance measuring light 6a, and a distance is measured by receiving the distance measuring light 6' from the object 2 to be measured. An elevation angle is calculated from time difference of the fan-shaped lights when the laser beams 5 for forming reference plane pass through the objects 2 to be measured. A horizontal angle is determined based on a result of detection by the horizontal angle detection encoder 31 when the laser beams 5 for forming reference plane pass through the object 2 to be measured, and a three-dimensional position of the object 2 to be measured is calculated.

When the spot-type distance measuring light 6b is selected for the distance measurement, the distance measurement is performed, and based on a photodetection of the reflection light from the object 2 to be measured, a horizontal angle of the projecting direction is detected by the horizontal angle detection encoder 31, and an elevation angle in the projecting direction is detected by an elevation angle detecting encoder 58 to be described later. Based on the result of the distance measurement, on the horizontal angle, and on the elevation angle thus detected, the three-dimensional position of the object 2 to be measured is calculated.

Now, referring to FIG. 3 and FIG. 4, a description will be given on the rotator 13.

The rotator 13 is rotatably mounted on the main unit 12 via bearings 51 and 51, and it is designed in such a manner that the rotator 13 is rotated in horizontal direction by a horizontal rotary motor 52.

The rotator 13 comprises a rotary frame 53, the reference plane forming unit 3 mounted on an upper portion of the rotary frame 53, a horizontal rotation axis tilt detecting unit 54 and a rotator cover 50 which is integrated with the rotary frame 53. The rotator cover 50 covers the horizontal rotation axis tilt detecting unit 54, the reference plane forming unit 3, and the rotary frame 53. In the figure, reference numeral 49 denotes a power feeding ring. Via the power feeding ring 49, electric power is supplied from the main unit 12 to the rotator 13.

An elevation rotary mirror 56 is rotatably disposed around an horizontal rotation axis 55 on the rotary frame 53. An elevation rotary motor 57 is provided on one end of the horizontal rotation axis 55, and an elevation angle detecting encoder 58 is provided on the other end of the horizontal rotation axis 55.

A pattern ring 59 of the elevation angle detecting encoder 58 is designed as a reflection mirror similarly to the rotary ring 28. The pattern ring 59 is disposed at a position opposite to the horizontal rotation axis tilt detecting unit 54. A detection light projected from the horizontal rotation axis tilt detecting unit 54 is reflected by the pattern ring 59, and is received by the horizontal rotation axis tilt detecting unit 54. Based on a deviation of the detecting position on the horizontal rotation axis tilt detecting unit 54, the tilting of the horizontal rotation axis 55 is detected. The elevation angle detecting encoder 58 has a reference point, and it is designed as an absolute encoder, which can detect an elevation angle from the reference point.

Figure 4:
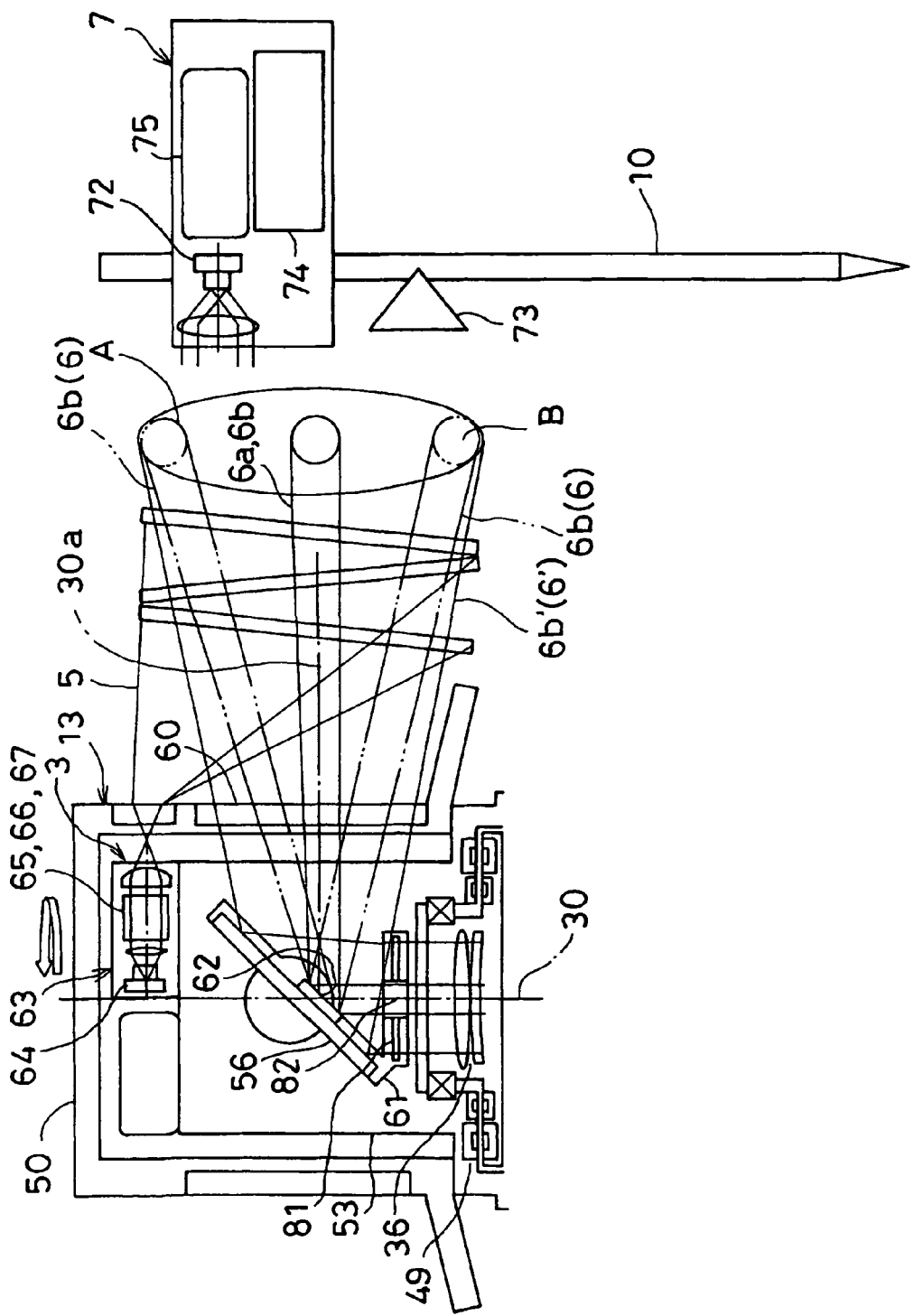
FIG. 4 is a partial view to show a rotating unit of the surveying device.

Referring to FIG. 4, a description will be given on the elevation rotary mirror 56 and a beam extension means disposed on the elevation rotary mirror 56.

Both surfaces of the elevation rotary mirror 56 are designed as reflection surfaces, and the elevation rotary mirror 56 is held on a mirror holder 61. The mirror holder 61 is rotatably mounted on the rotary frame 53 via the horizontal rotation axis 55. A reference position of the elevation rotary mirror 56 is a position tilted by 45° with respect to the distance measuring optical axis 30, which runs in vertical direction, and the distance measuring optical axis 30 is deflected from the elevation direction to the direction of a distance measuring optical axis 30a, which runs in horizontal direction.

A luminous flux form adjusting member 81 is held horizontally at a lower end of the mirror holder 61, i.e. at a position to perpendicularly cross the distance measuring optical axis 30. A hole 82 is drilled at a central portion of the luminous flux form adjusting member 81, and the distance measuring light 6 emitted from the distance measuring optical unit 16 passes through the hole 82. The luminous flux form adjusting member 81 has an optical action to reduce the size of the passing luminous flux in one direction. For instance, a lenticular lens or a light-receiving and light-emitting grating is used.

A high-speed deflection mirror 62 is attached on the reflection surface of the elevation rotary mirror 56, and the high-speed deflection mirror 62 is disposed at a position to concur with the distance measuring optical axis 30.

As the high-speed deflection mirror 62, a MEMS (Micro Electric Mechanical System) mirror is used. This mirror is vibrated at high velocity when high frequency voltage is applied, and the reflection surface is reciprocally rotated at a very small angle. For instance, it is reciprocally rotated in micro-scale in elevation direction with a line running perpendicularly to the paper surface in FIG. 4 as a center. Therefore, the distance measuring light 6 projected from the distance measuring optical unit 16 passes through the hole 82 and are reflected by the high-speed deflection mirror 62. When the high-speed deflection mirror 62 is vibrated, the distance measuring light 6 reciprocally perform a scanning in elevation direction from a position A to a position B.

The distance measuring light 6 projected via the high-speed deflection mirror 62, which is vibrating, are reflected by the object 2 to be measured, and the reflected distance measuring light 6' enters the rotator 13 with spreading. The luminous flux form adjusting member 81 reduces the size of luminous flux cross-section of the reflected distance measuring light 6' in one direction, and enters the reflected distance measuring light into the distance measuring optical unit 16.

From the reference position of the elevation rotary mirror 56, the elevation rotary mirror 56 is rotated in elevation direction via the horizontal rotation axis 55 by the elevation rotary motor 57. Thereby, the elevation angle of the projected distance measuring light 6 can be changed. Also, the elevation angle in this case can be detected by the elevation angle detecting encoder 58 (See FIG. 3).

Figure 6:
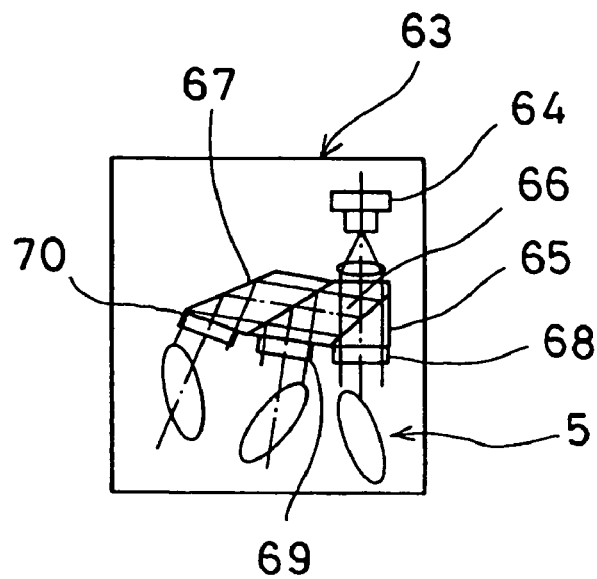
FIG. 6 is an arrow diagram along the arrow A in FIG. 3.

Now, referring to FIG. 6, a description will be given on the reference plane forming unit 3.

The reference plane forming unit 3 comprises a fan-shaped laser beam emitting unit 63 and a mechanism unit for rotatably supporting the fan-shaped laser beam emitting unit 63. The mechanism unit contains the rotary frame 53 rotatably supported and the horizontal rotary motor 52. A projecting direction (horizontal angle) of the laser beams 5 for forming reference plane is detected by the horizontal angle detecting encoder 31. The laser beams 5 for forming reference plane are reflected by the objects 2 to be measured, and the reflected lights are received by a photodetection sensor via the distance measuring optical unit 16. As the photodetection sensor, the tracking light photodetection sensor 44 is used. By detecting a horizontal angle of the horizontal angle detecting encoder 31 at the moment when the tracking light photodetection sensor 44 receives the reflection light of the laser beams 5 for forming reference plane, a horizontal angle of the object 2 to be measured with the surveying device 1 as a reference can be measured.

The fan-shaped laser beam emitting unit 63 comprises a laser beam emitting source 64 for forming reference plane, e.g. LD, or splitting prisms 65, 66, and 67, and condensing members 68, 69 and 70 disposed on exit surfaces of the splitting prisms 65, 66 and 67. As the condensing members 68, 69 and 70, a cylindrical lens, a diffraction grating, etc. are used. The laser beams emitted from the fan-shaped laser beam emitting unit 63 are split to three portions by the splitting prisms 65, 66 and 67. Further, by the condensing members 68, 69 and 70, the laser beam cross-section is adjusted to have an elliptical luminous flux cross-section having a cross-sectional longer axis in vertical direction. Three cross-sectional long axes are tilted at a known angle with respect to each other.

Next, referring to FIG. 4, the photodetection device 7 will be described.

The photodetection device 7 is provided at a known position on the pole 10, and the photodetection device 7 primarily comprises a photodetection device 72 for receiving the laser beams 5 for forming reference plane, a reflector such as a prism 73 for reflecting the distance measuring light 6, a photodetection side communication unit 74 for communicating with the communication unit 21 of the surveying device 1, a photodetection side control arithmetic unit 75, a photodetection side operation unit (not shown), and a photodetection side display unit (not shown).

As the communication method of the communication unit 21 and the photodetection side communication unit 74, a method such as radio communication, optical communication, etc. is adopted.

The photodetection side control arithmetic unit 75 calculates an elevation angle based on time difference of photodetection time of each of the fan-shaped laser beams when the photodetection device 72 receives the laser beams 5 for forming reference plane. The result of the calculation can be transmitted to the surveying device 1 by the photodetection side communication unit 74.

Now, a description will be given on operation.

FIG. 4 shows a case where the multi-measurement is performed. The mirror holder 61 is held in a position that the luminous flux form adjusting member 81 runs perpendicularly to the horizontal distance measuring optical axis 30a.

Therefore, the distance measuring light 6 projected from the distance measuring optical unit 16 passes through the hole 82 and are deflected in horizontal direction by the high-speed deflection mirror 62. When high frequency voltage is applied on the high-speed deflection mirror 62, the reflection surface is reciprocally rotated at high velocity in elevation direction at very small angle. Then, the distance measuring light 6 is vibrated at high velocity in a range of a predetermined angle in elevation direction. Then, the distance measuring light is projected as the fan-shaped distance measuring light 6a through a projection window 60 of the rotator cover 50. In case where the multi-measurement is performed, the elevation angle of the elevation rotary mirror 56 is set to a fixed angle except the case where the elevation angle is extensively deflected.

At the same time, under the condition that the laser beams 5 for forming reference plane are projected from the fan-shaped laser beam emitting unit 63, the horizontal rotary motor 52 is driven, and the laser beams 5 for forming reference plane and the distance measuring light 6 is projected in rotary irradiation.

Because the laser beams 5 for forming reference plane and the distance measuring light 6 have spreading in vertical direction and are rotated over total circumference, the measurement can be accomplished in wide range, and a plurality of objects 2 to be measured positioned in the range of projection can be measured (see FIG. 1). The fan-shaped distance measuring lights 6a are apparently shown as spreading in elevation direction. However, the spot-type light is reciprocally scanning in elevation direction, and the optical intensity is not decreased and is equal to the spot light, and the measurement can be made for long distance.

A reflected distance measuring light 6' from the prism 73 is received, and the distances are measured at the distance measuring unit 15. By detecting an angle of the horizontal angle detecting encoder 31 at the moment when the distance measuring light 6' is received, the horizontal angle is measured. The elevation angle measured by the photodetection device 7 is transmitted from the photodetection side communication unit 74, and an elevation angle with respect to the object 2 to be measured can be obtained. From the results of the measurements of the distance and the elevation angle, a height of the object 2 to be measured can be determined. Accordingly, the three-dimensional data of each of the objects 2 to be measured can be determined.

Figure 7:
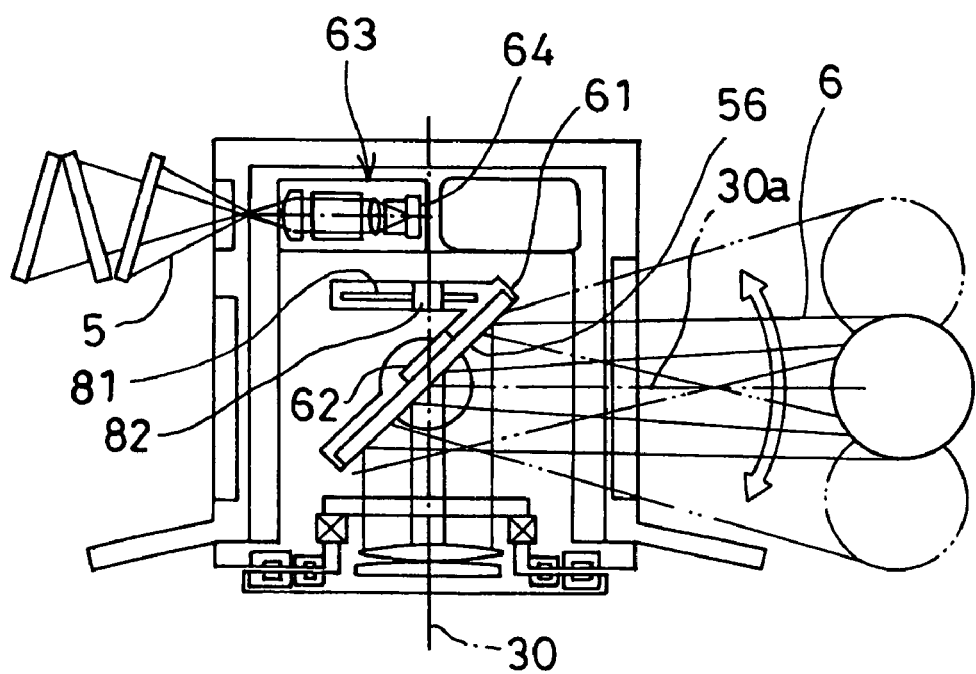
FIG. 7 is a partial view of the rotating unit in a condition that one-man operated measurement is performed by using the surveying device.

FIG. 7 shows a case where the one-man operated measurement is performed.

When measurement operation is shifted from the multi-measurement to the one-man operated measurement, the elevation rotary motor 57 is driven, and the mirror holder 61 is rotated by 180° around the horizontal rotation axis 55.

The luminous flux form adjusting member 81 is detached from the distance measuring optical axis 30, and the reflection surface of the elevation rotary mirror 56 where the high-speed deflection mirror 62 is not attached comes to a position opposite to the distance measuring optical unit 16. Therefore, the distance measuring light 6 emitted from the distance measuring optical unit 16 is projected as a spot-type light having narrow beam diameter. For the purpose of detaching the high-speed deflection mirror 62 from the optical path of the distance measuring light 6, the mirror holder 61 may be rotated by 90° in counterclockwise direction in FIG. 4.

First, as a preparation, the laser beams 5 for forming reference plane are projected from the fan-shaped laser beam emitting unit 63. The horizontal rotary motor 52 is driven, and the laser beams 5 for forming reference plane are projected in rotary irradiation.

When a reflection light from the object 2 to be measured is obtained, a horizontal angle with respect to the object 2 to be measured can be measured. An elevation angle data obtained at the photodetection device 7 is transmitted from the photodetection side communication unit 74. Based on the elevation angle data received at the communication unit 21, a direction of the object 2 to be measured can be acquired. As for the elevation angle, reflection light of the laser beams 5 for forming reference plane from the object 2 to be measured is received, and the elevation angle may be calculated according to the difference of photodetection time by the surveying device 1.

The distance measuring light 6 and the tracking light 25 are projected from the distance measuring unit 15, and the rotator 13 is rotated by the horizontal rotary motor 52. The mirror holder 61 is rotated by the elevation rotary motor 57, and the projecting direction is directed toward the object 2 to be measured.

When the tracking light 25 catches the object 2 to be measured and the distance measuring light 6 is reflected by the prism 73, the one-man operated distance measurement can be performed. Even when the object 2 to be measured is moved, the object 2 to be measured can be tracked by detecting the reflected tracking light 25'.

A horizontal angle and an elevation angle are measured by the horizontal angle detecting encoder 31 and the elevation angle detecting encoder 58 at the moment when the distance measuring light 6' is detected. Based on the result of the distance measurement, a height of the object 2 to be measured is determined, and the measurement of three-dimensional data of the object 2 to be measured can be accomplished.

As for the elevation angle, an elevation angle as obtained by the photodetection device 7 may be used.

In the case of the one-man operated measurement, optical intensity of the distance measuring light 6 is high and photodetection time of the reflected lights is long. As a result, measurement can be made on long distance. Also, the measurement accuracy is high because measurement can be performed as many times as required.

Figure 8:
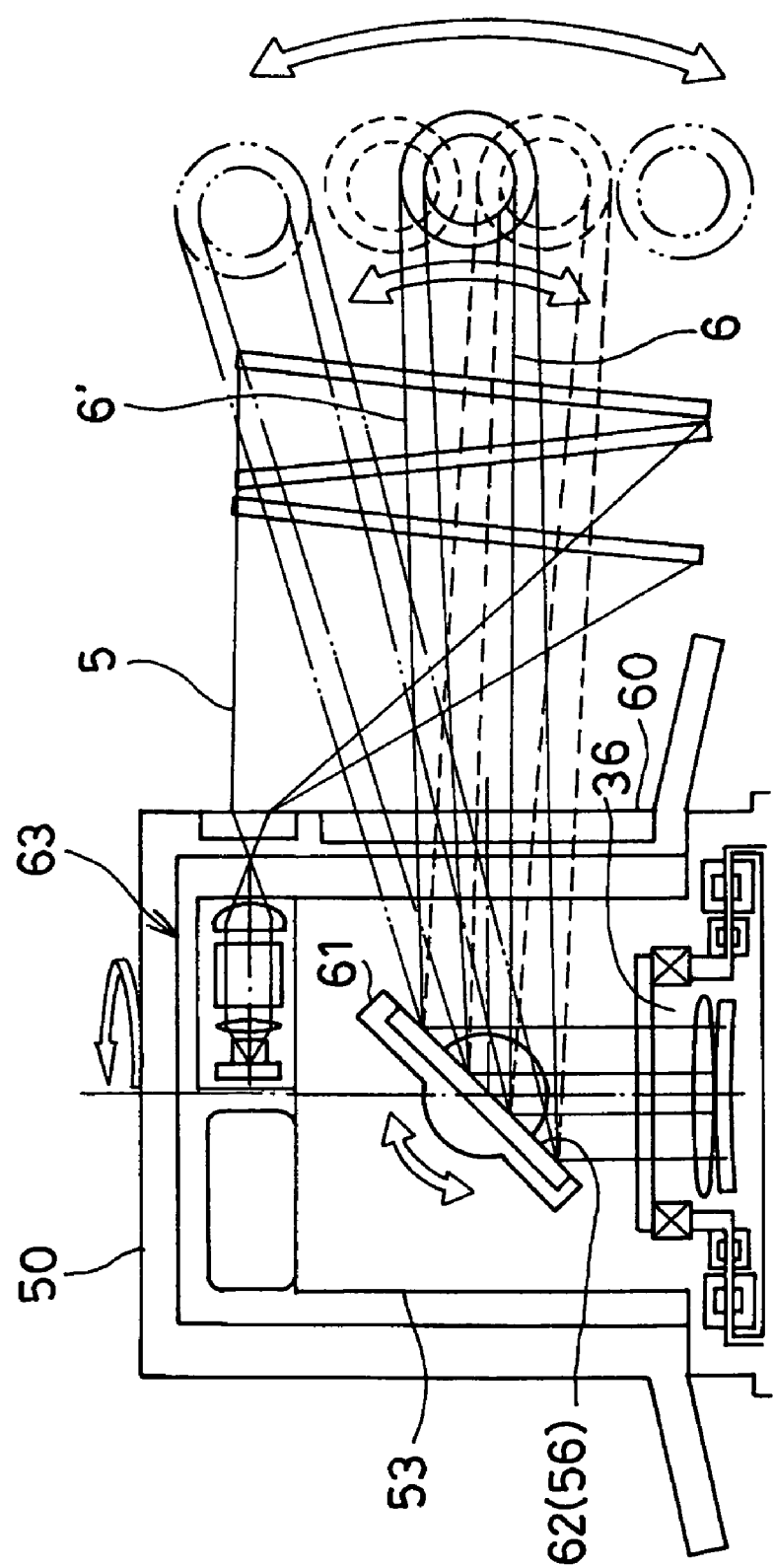
FIG. 8 is a partial view of the rotating unit of a second embodiment of the present invention, showing the rotating unit when multi-measurement is performed.

Now, referring to FIG. 8 and FIG. 9, a description will be given on the second embodiment. In FIG. 8, the equivalent component as shown in FIG. 4 is referred by the same symbol. The arrangement such as the main unit 12 is the equivalent as in the first embodiment, and is not shown in the figure.

In the second embodiment, one of the reflection surfaces of the elevation rotary mirror 56 in the first embodiment is replaced by a high-speed deflection mirror 62, e.g. by a MEMS mirror. The other reflection surface is a normal type planar mirror, which does not give any optical action on the distance measuring light 6 when reflected.

The high-speed deflection mirror 62 performs a reciprocal scanning within a very small angle in elevation direction on the distance measuring light 6 projected from the distance measuring optical unit 16, and the surveying device 1 performs a measurement on the object 2 to be measured, which is present within the range of scanning.

First, the laser beam (N-shaped fan-type beam) 5 for forming reference plane is projected in rotary irradiation. A reflected light from the object 2 to be measured (photodetection device 7) is received, and a horizontal angle of the photodetection device 7 is obtained. Then, the laser beam 5 for forming reference plane is received by the photodetection device 7, and an elevation angle with respect to the surveying device 1 is obtained. Then, elevation angle data is transmitted to the surveying device 1.

From the horizontal angle and the elevation angle thus obtained, the surveying device 1 calculates a direction of the object 2 to be measured. Based on a result of calculation, an elevation rotary motor 57 is driven, and an elevation angle of the high-speed deflection mirror 62 is determined (see FIG. 3).

Next, the elevation angle of the high-speed deflection mirror 62 is fixed. Then, the high-speed deflection mirror 62 itself is driven (reflection surface is vibrated), and is reciprocally rotated with very small angle in elevation direction. By the vibration of the high-speed deflection mirror 62, the spot light projected from the distance measuring optical unit 16 is projected as the fan-shaped laser beams for a distance measurement, which have small spreading in appearance.

Figure 9:
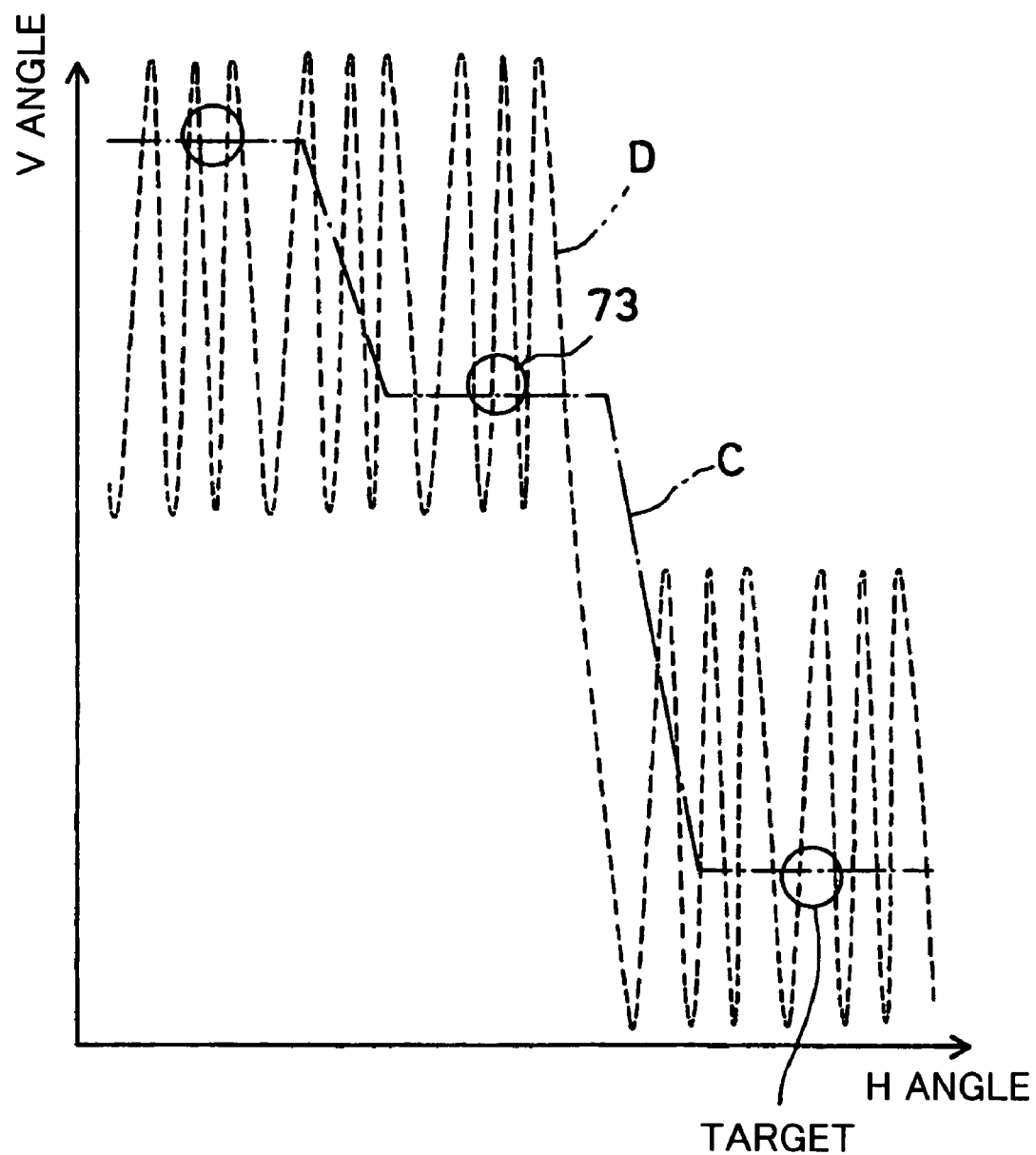
FIG. 9 is an explanatory drawing of a locus of the distance measuring light in the second embodiment of the present invention.

FIG. 9 is a diagram to explain a locus of the distance measuring light 6, which is projected in the second embodiment. In FIG. 9, a symbol C denotes a locus of a horizontal distance measuring optical axis 30a, i.e. a locus of the distance measuring light 6 in case where the distance measuring light is reflected only by tilting of the high-speed deflection mirror 62 when the high-speed deflection mirror 62 is not vibrated. A symbol D represents an actual locus of the distance measuring light 6 in case where the high-speed deflection mirror 62 is vibrated, and further, the elevation angle of the high-speed deflection mirror 62 is changed. In FIG. 9, reference numeral 73 denotes a prism of the object 2 to be measured. When the locus D passes through the prism 73, the reflected distance measuring light 6' is obtained.

In the second embodiment, the elevation angle of the high-speed deflection mirror 62 is controlled based on the horizontal angle and the elevation angle of the object 2 to be measured as acquired in advance, and there is no need to increase the apparent spreading angle of the distance measuring light 6. The spreading angle of the distance measuring light 6 may be at such a value that errors are absorbed when the elevation angle of the high-speed deflection mirror 62 is adjusted by the elevation rotary motor 57.

Or, it may be so designed that the distance measuring light 6 is projected in such extent that the distance measuring light 6 passes through the prism 73 to save power.

When the one-man operated measurement is performed in the second embodiment, the vibration of the high-speed deflection mirror 62 may be stopped, and it may be used as an elevation rotary mirror 56, which merely reflects the distance measuring light 6. Or, a rear surface of the high-speed deflection mirror 62 may be designed as a reflection surface and the mirror holder 61 is rotated at an angle of 90° or 180° and the distance measuring light 6 is reflected.

Also, a small mirror may be used so that the deflecting direction of the distance measuring light 6 is changed at high velocity without driving of the high-speed deflection mirror 62 through vibration. And by combining with the elevation rotary mirror 56, the distance measuring light 6 can be directed toward the object 2 to be measured at high velocity. By using the elevation angle and the horizontal angle obtained by using the laser beams 5 for forming reference plane in the multi-measurement, the multi-measurement can be performed by projecting the distance measuring light 6 in the direction to the object to be measured, and collimation can be performed at high velocity in the one-man operated measurement.

Now, referring to FIG. 10 and FIG. 11, a description will be given on the third embodiment of the invention.

In the third embodiment, it is so designed that the distance measuring light 6 entering the distance measuring optical unit 16 are vibrated by the high-speed deflection mirror 62.

Figure 3:
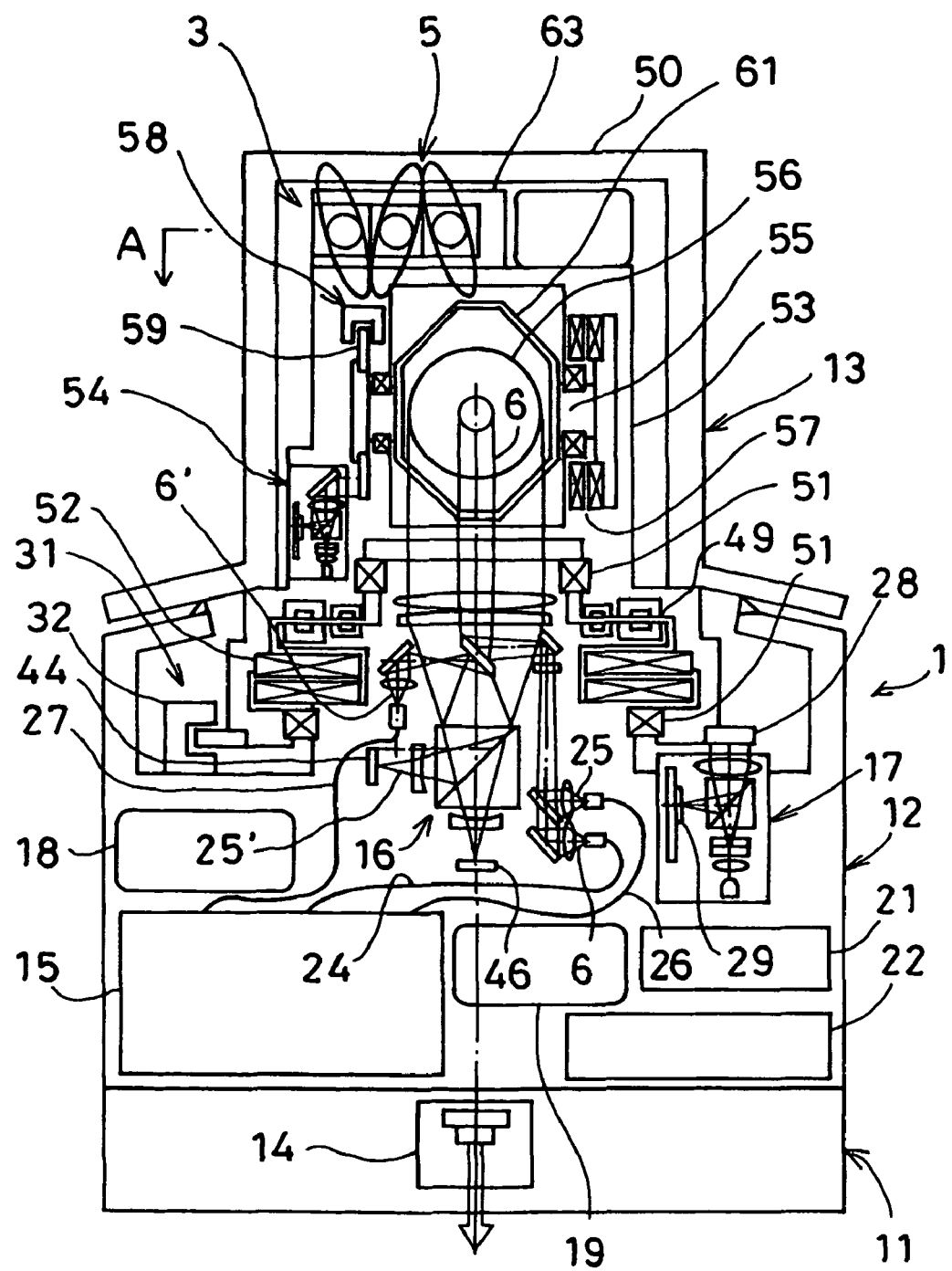
FIG. 3 is a schematical block diagram of the surveying device according to the first embodiment of the present invention.
Figure 10:
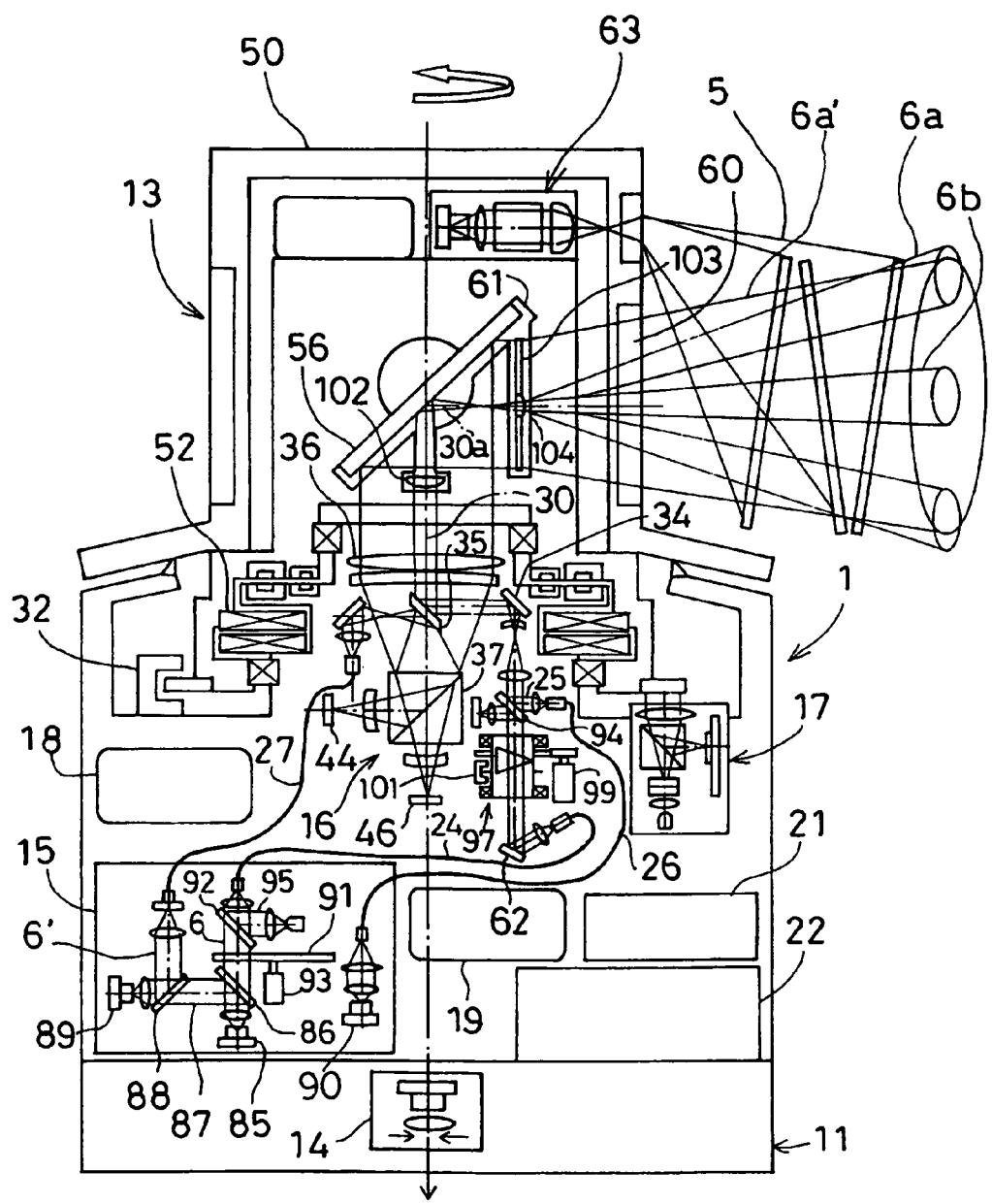
FIG. 10 is a schematical drawing to show a surveying device according to a third embodiment of the present invention.
Figure 11:
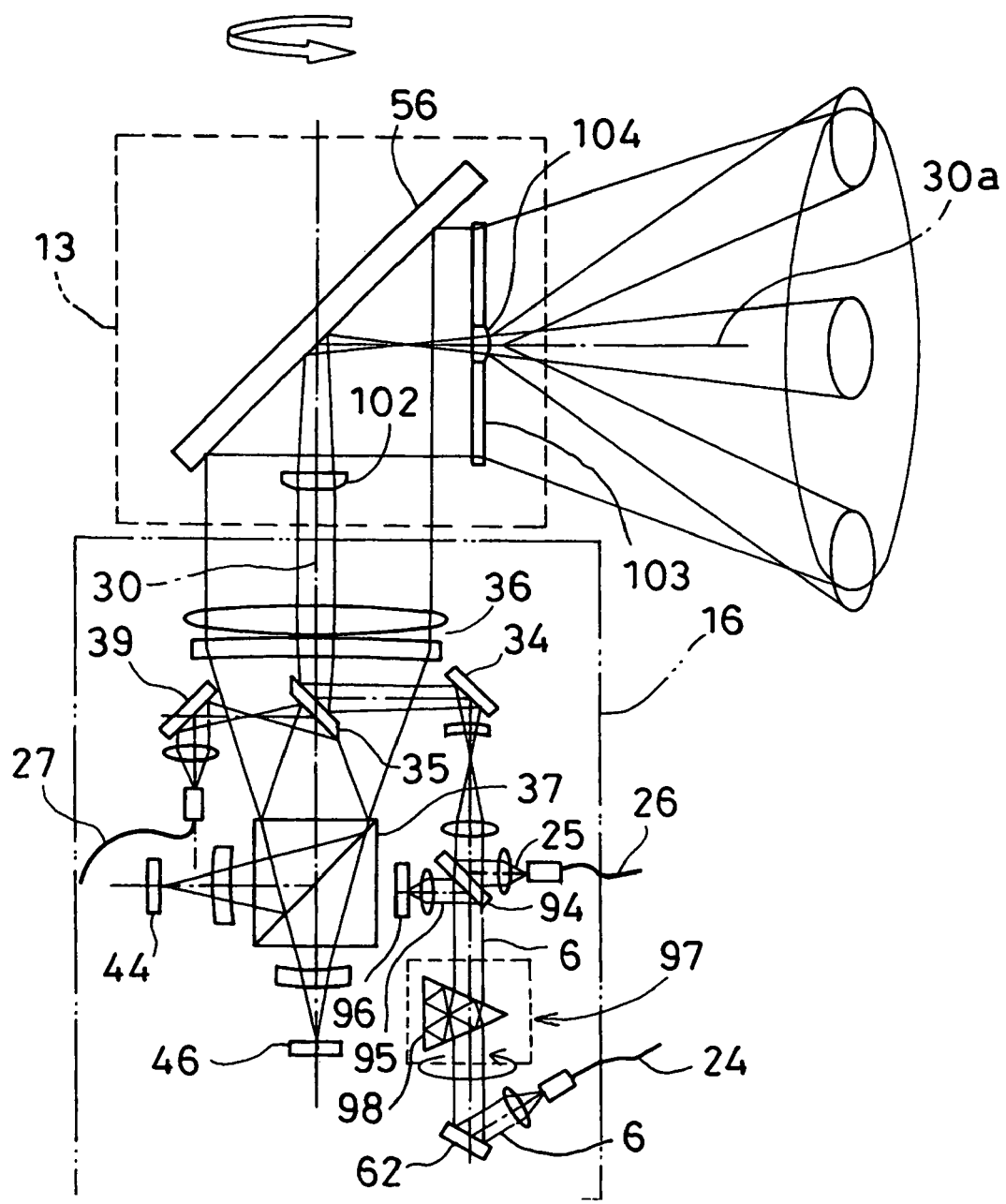
FIG. 11 is a schematical drawing to show a distance measuring optical unit in the third embodiment of the present invention.

In FIG. 10 and FIG. 11, the equivalent components as shown in FIG. 3 and FIG. 4 are represented by the same symbols, and a detailed description is not given here.

In the third embodiment, the high-speed deflection mirror 62 is applied as a mirror 33*a* (see FIG. 5) used in the first embodiment.

First, a description will be given on a general feature of the optical system of the distance measuring unit 15.

A laser diode 85 is a light emitting source to emit the distance measuring light 6. A half-mirror 86 is disposed on an optical axis of the laser diode 85. By the half-mirror 86, a part of the distance measuring lights 6 is reflected as an internal reference light 87. Then, the part of the distance measuring lights 6 is received by a photodetector 89 via a half-mirror 88. After passing through the half-mirror 86, the distance measuring light 6 enters an incident end of the first glass fiber 24 via a variable density filter 91 and a half-mirror 92.

The variable density filter 91 has its density changing in circumferential direction. When the variable density filter 91 is rotated by a density varying motor 93, an optical density value of the projected distance measuring light 6 is changed. The rotation of the density variable motor 93 is controlled by the arithmetic control unit 19.

After entering the distance measuring optical unit 16, the reflected distance measuring light 6' enters the distance measuring unit 15 via a third glass fiber 27 and is reflected by the half-mirror 88 to enter the photodetector 89.

Based on the internal reference light 87 entering the photodetector 89 and on the reflected distance measuring light 6', a distance to the object 2 to be measured is measured. The variable density filter 91 adjusts the optical intensity of the distance measuring light 6 as projected so that the optical density of the reflected distance measuring light 6' will be equal or equivalent to the optical density of the internal reference light 87. In FIG. 10, reference numeral 90 represents a LD for tracking, which emits the tracking light 25.

Next, a description will be given on the distance measuring optical unit 16.

Being guided by the first glass fiber 24, the distance measuring light 6 is emitted from an exit end of the first glass fiber 24. Then, the distance measuring light is reflected by the high-speed deflection mirror 62 and enters the distance measuring optical unit 16.

The high-speed deflection mirror 62 is a MEMS mirror. It is controlled by the arithmetic control unit 19 and reciprocally tilts and moves a reflection surface in a predetermined direction. The high-speed deflection mirror 62 has the equivalent function as the function of the mirror 33*a* as shown in FIG. 5, and the distance measuring light 6 is reflected along the optical axis of the tracking light 25 reflected by a mirror 94. The mirror 94 has the equivalent function as the function of the mirror 33*b*. The mirror 94 separates a MEMS control light 95 (to be described later) from the distance measuring light 6, reflects the MEMS control light 95, and enters the MEMS control light 95 into an image sensor 96. Preferably, it is so designed that a wavelength of the MEMS control light 95 is different from the wavelength of the distance measuring light 6, and the mirror 94 is designed as a dichroic mirror, which allows the distance measuring light 6 to pass but reflects the MEMS control light 95.

The image sensor 96 is a two-dimensional sensor having a predetermined area, and the image sensor 96 detects a shape of luminous flux cross-section of the MEMS control light 95 and also detects an amplitude direction of the MEMS control light 95. The result of the detection is outputted to the arithmetic control unit 19. Based on the result of detection from the image sensor 96 and on the result of detection from an encoder 101, the arithmetic control unit 19 controls a rotating speed and a phase of rotation of an image rotator motor 99.

An image rotator 97 is disposed between the high-speed deflection mirror 62 and the mirror 94.

The image rotator 97 comprises an image rotating prism 98, an image rotator motor 99 for rotating the image rotating prism 98, and an encoder 101 for detecting a rotation angle of the image rotating prism 98 etc.

The image rotator is an optical member (a part or a combination of parts) for rotating an image through rotation of the optical member by using the reflection or the refraction, a sum of the times of which is odd, based on the reflection or the refraction or on a combination of reflection and refraction. Normally, when the image rotator 97 is rotated by one-half turn, the image is rotated by one turn. In the present embodiment, the image rotator 97 is synchronized and is rotated at a velocity of ½ of the rotation of the rotator 13, which projects the distance measuring light 6 in rotary irradiation. As a result, the amplitude direction (deflecting direction) of the distance measuring light 6 by the high-speed deflection mirror 62 is adjusted to be turned to a certain fixed direction with respect to the rotator.

The rotator 13 deflects the distance measuring light 6 projected from the distance measuring optical unit 16 in horizontal direction and projects the distance measuring light in rotary irradiation. Also, the rotator 13 deflects a reflection light from the object 2 to be measured and enters the reflection light the distance measuring optical unit 16. In the following, a description will be given on the rotator 13.

A mirror holder 61 is rotatably supported on a rotary frame 53 via a horizontal rotation axis 55, and the mirror holder 61 is rotated in elevation direction around the horizontal rotation axis 55 by an elevation rotary motor 57 (see FIG. 3).

The mirror holder 61 holds an elevation rotary mirror 56 with both surfaces as reflection surfaces, and also holds a first cylindrical lens 102 (acting as a deflection range extending member) and a luminous flux forming adjusting member 103. The elevation rotary mirror 56 is held at a position at an angle of 45° (reference position) with respect to the distance measuring optical axis 30. The first cylindrical lens 102 is held at the reference position so that the first cylindrical lens 102 is positioned on the distance measuring optical axis 30. Further, the luminous flux form adjusting member 103 is held so that the luminous flux form adjusting member 103 is disposed perpendicularly to the horizontal distance measuring optical axis 30a. The first cylindrical lens 102 is disposed at a position to be conjugated with the high-speed deflection mirror 62.

For instance, a lenticular lens or a light-receiving and light-emitting grating is used as the luminous flux form adjusting member 103, and the luminous flux for adjusting member 103 extends or reduces luminous flux cross-section in elevation direction to adjust the form of luminous flux cross-section. A second cylindrical lens 104 is provided at the central portion of the luminous flux form adjusting member 103, i.e. on the horizontal distance measuring optical axis 30a as a deflection range extending member.

The deflection range extending member is an optical system with different angular magnification with respect to rotating direction of the emitted light. For instance, a cylinder lens, an anamorphic expander or the like is used. A normal type beam expander may also be used.

A description will be given now on an operation of the third embodiment.

Each of FIG. 10 and FIG. 11 represents an arrangement where the multi-measurement is performed. The first cylindrical lens 102 is located on the distance measuring optical axis 30, and the second cylindrical lens 104 is located on the horizontal distance measuring optical axis 30a.

The high-speed deflection mirror 62 is driven by the arithmetic control unit 19. The reflection surface is vibrated in one direction. The distance measuring light 6 and the MEMS control light 95 are reflected while being vibrated on a predetermined direction at high velocity by the high-speed deflection mirror 62.

The image rotator 97 rotates the distance measuring light 6 around the optical axis so that the distance measuring light 6 enter the elevation rotary mirror 56 by maintaining a certain fixed relation at all times. The image rotator 97 is controlled by the arithmetic control unit 19 so that the distance measuring light 6 reflected by the elevation rotary mirror 56 are vibrated in elevation direction at all times.

The MEMS control light 95 is vibrated integrally with the distance measuring light 6 by the high-speed deflection mirror 62 and is rotated integrally by the image rotator 97. Therefore, by detecting the form of luminous flux cross-section and amplitude direction of the MEMS control light 95 by the image sensor 96, the form of the luminous flux cross-section and the amplitude direction of the distance measuring light 6 can be detected. Based on the result of detection by the image sensor 96, a rotation of the mirror holder 61 and a rotation of the image rotating prism 98 are controlled in synchronization.

A part of the distance measuring light 6 may be split by the mirror 94 and may be used as the MEMS control light 95.

After being projected from the distance measuring optical unit 16, amplitude angle of the distance measuring light 6 is extended by the first cylindrical lens 102 and the second cylindrical lens 104 and the distance measuring light is turned to the fan-shaped distance measuring light 6a and is projected in rotary irradiation by the rotation of the rotator 13. Because the fan-shaped distance measuring light 6a is formed through amplification of the spot-type light, the optical intensity is high, and the measurement can be performed on the long distance.

The reflected fan-shaped distance measuring light 6a', which is reflected from the object 2 to be measured and has a spreading angle, is converged to parallel beams by the luminous flux form adjusting member 103. Then, the reflected fan-shaped distance measuring light enters the distance measuring optical unit 16, and the distance is measured by the distance measuring unit 15.

As is the same as already described in the other embodiments, the laser beam 5 for forming reference plane is projected from the fan-shaped laser beam emitting unit 63.

Next, a description will be given on a case where the one-man operated measurement is performed.

In the case of the one-man operated measurement, the mirror holder 61 is rotated by an angle of 90° or 180° so that the first cylindrical lens 102, the luminous flux form adjusting member 103, and the second cylindrical lens 104 are detached from the distance measuring optical axis 30 and the horizontal distance measuring optical axis 30a. The driving of the high-speed deflection mirror 62 and the image rotator 97 is stopped.

The laser beam 5 for forming reference plane is projected in rotary irradiation, and a horizontal angle and an elevation angle of the object 2 to be measured are measured in advance.

The distance measuring light is reflected by the mirror 34 and the mirror 35 via the image rotator 97. Further, the distance measuring light is reflected in a state of the spot-type lights by the elevation rotary mirror 56 and is projected along the horizontal distance measuring optical axis 30a. Also, the tracking light 25 is reflected by the mirror 34 and the mirror 35, and further, is reflected by the elevation rotary mirror 56, and the tracking light is projected along the horizontal distance measuring light optical axis 30a.

Tracking is started when the tracking light 25 is detected by the tracking light photodetection sensor 44. Further, the reflected spot type distance measuring light 6b' enter the distance measuring unit 15 via the distance measuring optical unit 16, and the distance is measured.

Figure 12:
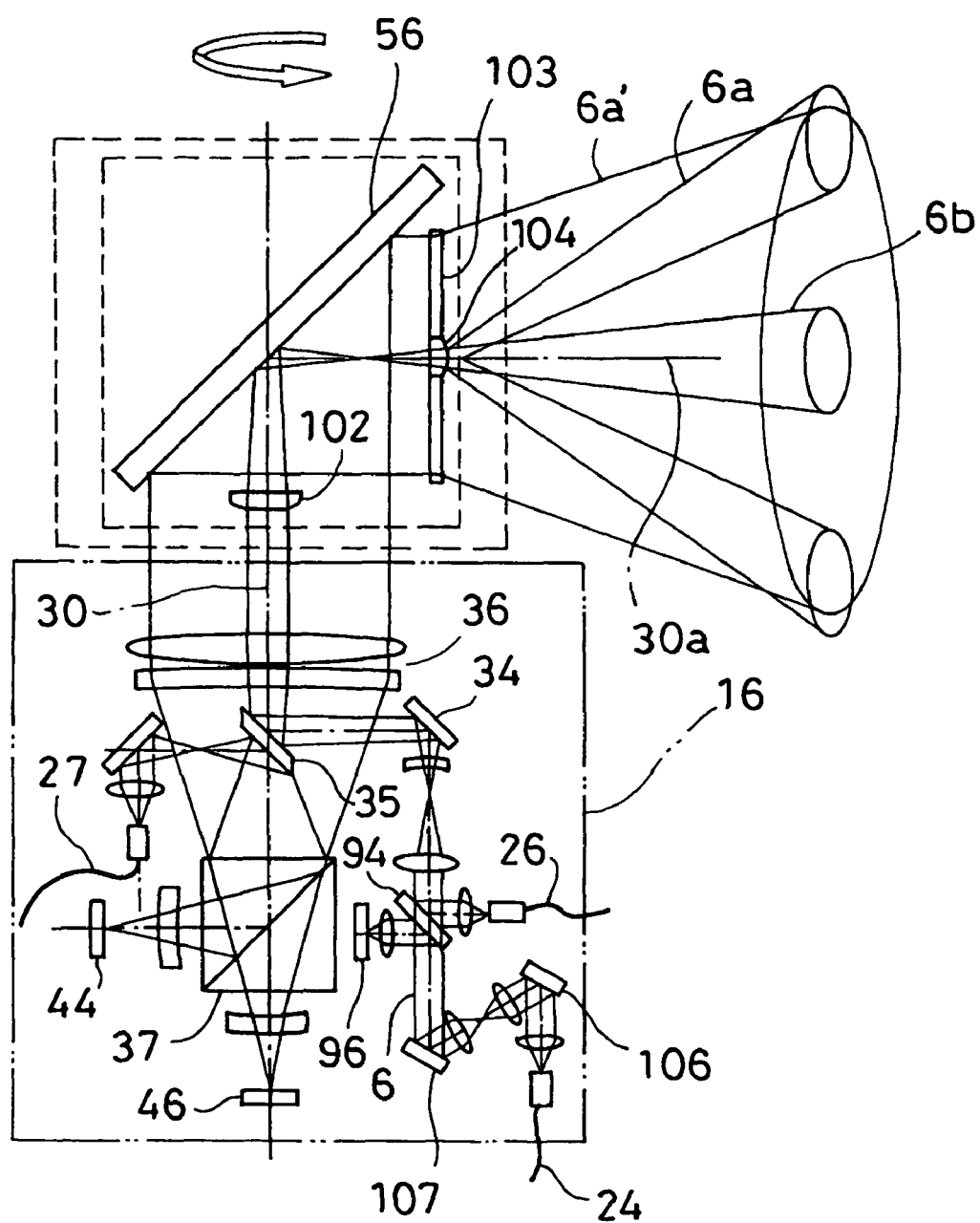
FIG. 12 is a schematical drawing to show a distance measuring optical unit in a fourth embodiment of the present invention.

FIG. 12 shows the fourth embodiment of the invention. The fourth embodiment is a variation developed from the third embodiment. The image rotator 97 is not used. The distance measuring light 6 entering the distance measuring optical unit 16 is amplified by two MEMS mirrors in order to control the amplitude direction. In FIG. 12, the equivalent component as shown in FIG. 10 and FIG. 11 are referred by the same symbol, and a detailed description is not given here.

In the fourth embodiment, two MEMS mirrors 106 and 107 are disposed at positions opposite to each other. The distance measuring light 6 guided by the first glass fiber 24 is reflected by the MEMS mirrors 106 and 107 and enters the distance measuring optical unit 16.

The reflection surface of the MEMS mirror 106 is vibrated so that the distance measuring light 6 entering the MEMS mirror 107 is vibrated in a direction perpendicular to the paper surface, for instance, and the reflection surface of the MEMS mirror 107 is vibrated so that the reflected light is vibrated in parallel to the paper surface. The phases of vibration of the MEMS mirror 106 and the MEMS mirror 107 are controlled by the arithmetic control unit 19 (see FIG. 10), and the distance measuring light 6 reflected by the mirror 94 is directed to a certain fixed direction with respect to the elevation rotary mirror 56.

For instance, under the condition as shown in FIG. 12, the distance measuring light 6 reflected by the MEMS mirror 107 is amplified so that the distance measuring light runs in parallel to the paper surface. Under the condition that the distance measuring light 6 is reflected in a direction perpendicular to the paper surface by the elevation rotary mirror 56, the distance measuring light 6 reflected by the MEMS mirror 107 is amplified in a direction perpendicular to the paper surface.

The amplified distance measuring light 6 enters the first cylindrical lens 102 and the second cylindrical lens 104 via the distance measuring optical unit 16. The amplifying angle is extended, and the distance measuring light is projected in rotary irradiation by the rotator 13 as the fan-shaped distance measuring light 6a, and the multi-measurement is performed.

When the one-man operated measurement is performed, the elevation rotary mirror 56 is rotated by an angle of 90° or 180°. The first cylindrical lens 102 and the second cylindrical lens 104 are retracted from the optical axis. By stopping the MEMS mirror 106 and the MEMS mirror 107, the spot-type distance measuring light 6b is projected via the distance measuring unit 15 and the rotator 13.

Operations of the multi-measurement and the one-man operated measurement are the equivalent as described in the third embodiment, and a detailed description is not given here.

In the fourth embodiment, the MEMS mirror 106 and the MEMS mirror 107 fulfill the functions of the high-speed deflection mirror 62 and also fulfill the function as the image rotator 97 in the third embodiment.

In the fourth embodiment, it is so arranged that the amplifying direction of the distance measuring light 6 is in a constant direction by using two MEMS mirrors 106 and 107. The equivalent operation can be accomplished by a single MEMS mirror through application of the MEMS mirror, which can be driven on two axes.

The invention claimed is:

1. A surveying device, comprising a light source for emitting a distance measuring light, an elevation rotary mirror for deflecting said distance measuring light in a direction toward an object to be measured and for rotating in an elevation direction, a high-speed deflection mirror for deflecting said distance measuring light at a speed higher than said elevation rotary mirror and for giving an amplitude in elevation direction to said distance measuring light, a distance measuring light projecting unit for projecting said distance measuring light, and an arithmetic control unit for controlling driving of said high-speed deflection mirror and said elevation rotary mirror.

2. A surveying device according to claim 1, wherein said high-speed deflection mirror is disposed on an optical axis passing portion of the elevation rotary mirror, said distance measuring light is projected via said high-speed deflection mirror, and the reflected distance measuring light reflected by the object to be measured is received via a condensing member.

3. A surveying device according to claim 1, wherein said high-speed deflection mirror is disposed on one surface of said elevation rotary mirror, and the other surface of said elevation rotary mirror is used as a reflection mirror.

4. A surveying device according to claim 1, wherein a mirror surface of said elevation rotary mirror is arranged by using a mirror surface of said high-speed deflection mirror, and said elevation rotary mirror deflects said distance measuring light in a direction of the object to be measured by a driving unit for driving a holding unit for holding said high-speed deflection mirror.

5. A surveying device according to claim 1, wherein said distance measuring light projecting unit comprises a rotator for projecting the distance measuring light in rotary irradiation, an image rotator, and an image rotator rotating unit for rotating said image rotator, and wherein said rotator can be adjusted by said image rotator rotating unit so that a deflecting direction of said distance measuring light reflected by said high-speed deflection mirror is directed in a direction toward the object to be measured.

6. A surveying device according to claim 1, wherein said distance measuring light projecting unit has an elevation rotary mirror for deflecting the distance measuring light in a direction toward the object to be measured, wherein two of said high-speed deflection mirrors are disposed at positions opposite to each other, and wherein said high-speed deflection mirrors have reflection surfaces with different moving directions, and the deflecting direction of the distance measuring light projected via said two high-speed deflection mirror can be adjusted so that it is directed toward the object to be measured.

7. A surveying device according to claim 5 or 6, wherein said distance measuring light is projected with a deflection range in elevation direction extended by a deflection range extending member, and the reflected distance measuring light reflected by said object to be measured is received via a condensing member.

8. A surveying device according to claim 1, further comprising a fan-shaped beam projecting unit for projecting two or more fan-shaped beams with at least one of the fan-shaped beams being tilted, a fan-shaped beam receiving unit for receiving the reflected fan-shaped beam reflected from the object to be measured, and a fan-shaped beam projecting direction detecting unit for detecting a fan-shaped beam projecting direction of said fan-shaped beam projecting unit, wherein said arithmetic control unit calculates a direction of the object to be measured based on signal from said fan-shaped beam receiving unit and from said fan-shaped beam projecting direction detecting unit.

9. A surveying device according to claim 5, wherein said arithmetic control unit controls said high-speed deflection mirror and said rotating unit so that the projected distance measuring light is projected to said object to be measured based on the acquired direction of the object to be measured.

10. A surveying device according to one of claims 1, and 2 to 6, wherein said high-speed deflection mirror is a MEMS mirror.

11. A surveying system, comprising a surveying device and an object to be measured, wherein said surveying device comprises a distance measuring light projecting unit for projecting a distance measuring light, which has a light source for emitting said distance measuring light, an elevation rotary mirror for deflecting said distance measuring light in a direction toward said object to be measured and for rotating in an elevation direction, and a high-speed deflection mirror for deflecting said distance measuring light at a speed higher than said elevation rotary mirror and for giving an amplitude in elevation direction to said distance measuring light,
 a projecting direction detecting unit for detecting a projecting direction of the distance measuring light from said distance measuring light projecting unit,
 a distance measuring unit for measuring a distance based on a reflection light from the object to be measured, a fan-shaped beam projecting unit for projecting two or more fan-shaped beams, with at least of one of the fan-shaped beams being tilted, in rotary irradiation, a first communication unit, and an arithmetic control unit for controlling a driving of said elevation rotary mirror and said high speed deflecting mirror, and wherein said object to be measured has a reflector for reflecting said distance measuring light, a fan-shaped beam receiving unit for receiving the fan-shaped beams, and a second communication unit for transmitting a signal from said fan-shaped beam receiving unit to said first communication unit.

12. A surveying system according to claim 11, wherein said high-speed deflection mirror is disposed on an optical axis passing portion of the elevation rotary mirror, said distance measuring light is projected via said high-speed deflection mirror, and the reflected distance measuring light reflected by the object to be measured is received via a condensing member.

13. A surveying system according to claim 11, wherein said high-speed deflection mirror is disposed on one surface of said elevation rotary mirror, and the other surface of said elevation rotary mirror is used as a reflection mirror.

14. A surveying system according to claim 11, wherein said distance measuring light projecting unit comprises a rotator for projecting the distance measuring light in rotary irradiation, an image rotator, and an image rotator rotating unit for rotating said image rotator, wherein said rotator can be adjusted by said image rotator rotating unit so that deflecting direction of said distance measuring light reflected by said high-speed deflection mirror is directed in a direction toward the object to be measured.

15. A surveying system according to claim 11, wherein said distance measuring light projecting unit has an elevation rotary mirror for deflecting the distance measuring light in a direction toward the object to be measured, wherein two of said high-speed deflection mirrors are disposed at positions opposite to each other, and wherein said high-speed deflection mirrors have reflection surfaces with different moving directions, and the deflecting direction of the distance measuring light projected via said two high-speed deflection mirror can be adjusted so that it is directed toward the object to be measured.

16. A surveying system according to claim 14 or 15, wherein said distance measuring light is projected with a deflection range in elevation direction extended by a deflection range extending member, and wherein the reflected distance measuring light reflected by said object to be measured is received via a condensing member.

* * * * *